CHESTER W. NEWELL &
RICHARD W. PALTHE
INVENTORS

BY Robert G. Clay
ATTORNEY

CHESTER W. NEWELL &
RICHARD W. PALTHE
INVENTORS

BY Robert S. Clay
ATTORNEY

PULSE SEPARATOR

Filed Dec. 27, 1960 5 Sheets-Sheet 3

CHESTER W. NEWELL &
RICHARD W. PALTHE
INVENTORS

BY Robert S. Clay
ATTORNEY

PULSE SEPARATOR

Filed Dec. 27, 1960

5 Sheets-Sheet 4

CHESTER W. NEWELL &
RICHARD W. PALTHE
INVENTORS

BY Robert S. Clay
ATTORNEY

CHESTER W. NEWELL &
RICHARD W. PALTHE
INVENTORS

BY Robert S. Clay
ATTORNEY

United States Patent Office 3,038,034

Patented June 5, 1962

3,038,034

PULSE SEPARATOR

Chester W. Newell, Sunnyvale, and Richard W. Palthe, San Carlos, Calif., assignors to Ampex Corporation, Redwood City, Calif., a corporation of California Filed Dec. 27, 1960, Ser. No. 78,473
11 Claims. (Cl. 178—69.5)

This invention relates to pulse separators that are sensitive to the duration of electric pulses for developing signals only in response to pulses of certain duration.

In standard television receiving sets, a raster-type scan of the beam is effected over the viewing screen. The scan is controlled by a synchronizing portion of the incoming video signal so that the beam retraces from the bottom to the top of the viewing screen at the end of each video "field." A series of vertical synchronizing pulses in the video signal are usually sensed by a form of integrating filter to provide an integrated wave form. A vertical oscillator is connected to the filter, and when the integrated signal strength exceeds the cut-off level of the oscillator grid, the oscillator responds to initiate the desired retrace action. But the integrated wave form has a gently sloping and somewhat jagged shape. Any error in the slope of the integrated wave causes a corresponding error in the time at which the vertical oscillator grid cut-off level is reached to initiate retrace, with consequent disruption of the timing action and distortion of the picture.

Thus, the standard receiver requires extremely precise adjustment to provide the vertical retrace timing action required, and is all too easily mis-adjusted with the resulting timing error being multiplied in proportion to the mis-adjustment.

In another use of the standard integrating filter, as in pulse-regenerating devices, a further disadvantage arises in that the filter depends on the sensing of a number of sequential pulses to produce the integration level required to trigger the vertical oscillator, and as a consequence the filter first indicates the arrival of a vertical blanking zone of the signal after substantially half of the zone has already passed. Consequently, in the past, the pulse-regeneration has been initiated during the arrival of a particular vertical blanking zone by means of a time-delay signal originating in the middle of the previous blanking zone, an entire field away. But in such arrangements the probability of timing error is greatly increased.

Another need in the color television art is for an improved means for responding only to horizontal synchronizing pulses to initiate action in connection with the immediately following "color burst" group of pulses.

Accordingly, it is an object of the present invention to provide a pulse separator that, within a wide range of adjustment, accurately selects pulses of predetermined widths and accurately responds to such pulses with substantially no timing errors.

It is another object of this invention to provide a pulse separator responding to pulses falling within a wide predetermined range of time-duration widths and selecting such pulses from among others of different widths, the apparatus producing an output signal that is accurately responsive to the width of the predetermined pulses and no others.

It is still another object of this invention to provide a pulse separator as above described and capable of performing with substantially undiminished discrimination throughout a wide range of adjustment.

It is a further object of this invention to provide a pulse separator responsive to the widths of predetermined input pulses to instantly and positively develop an output pulse in response to the arrival of each such input pulse.

It is a further object of this invention to provide a pulse separator responding instantly and exclusively to the leading pulse of each vertical blanking zone of a video synchronizing signal and indicating the arrival of each such leading pulse with substantially no timing delay or error, the circuit functioning with undiminished accuracy over a wide range of adjustment and mis-adjustment thereof, and over a correspondingly wide range of inadvertant variation in the width of the leading pulses.

In accordance with the present invention, a pulse separator is provided for responding to the characteristic width of certain preselected pulses, such as equalizing or horizontal synchronizing pulses, and developing an output signal corresponding to the desired pulses and no others. To attain this result, a resonant circuit is coupled to receive all of the input pulses and is adjusted to reinforce certain portions of the tank output wave in response to the widths of the preselected pulses. Clipping means are used to clip the reinforced portions of the tank output signal, leaving only pulses corresponding with the preselected input pulses; and further wave-shaping means are employed to shape the separator output signal for various uses.

Other objects and advantages of the invention will be explained in the following specification, considered together with the accompanying drawings, in which.

Figure 1:
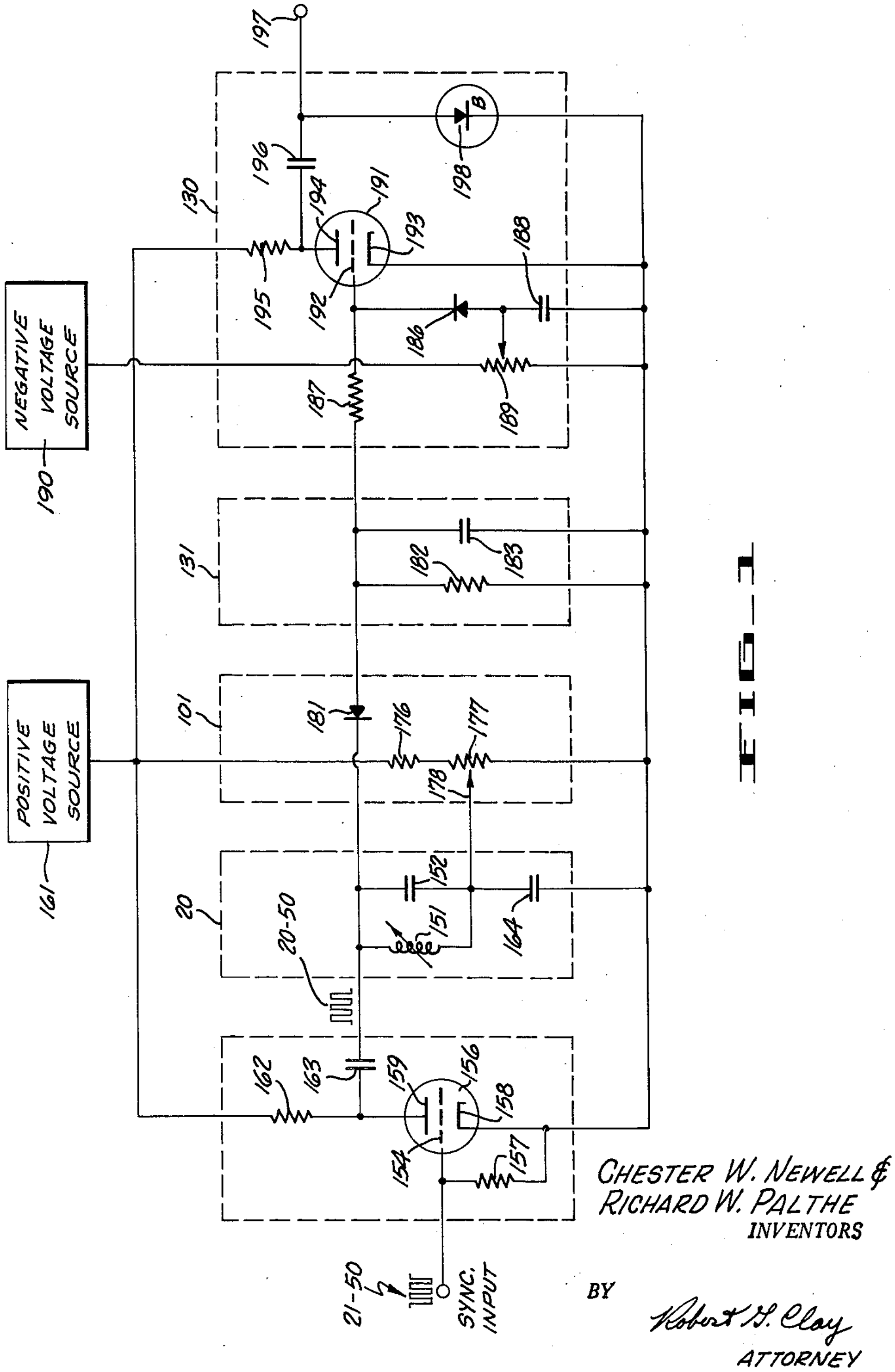
FIGURE 1 is a schematic circuit diagram of one embodiment of a pulse separator constructed in accordance with the present invention.
Figure 3:
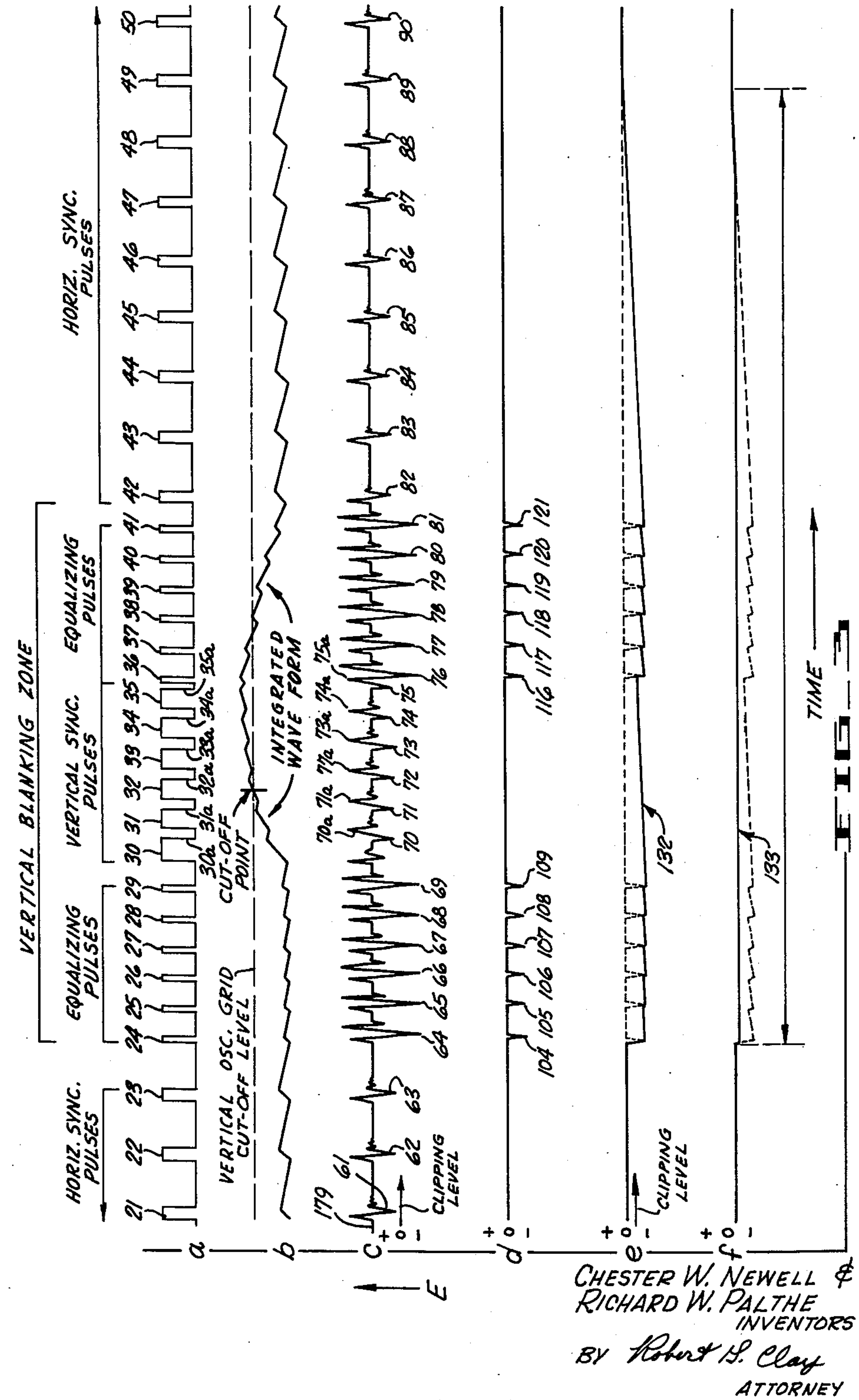
FIGURE 3 is a series of time-correlated wave-forms illustrating the operation of a television receiver and the separator of FIGURE 1.
Figure 4:
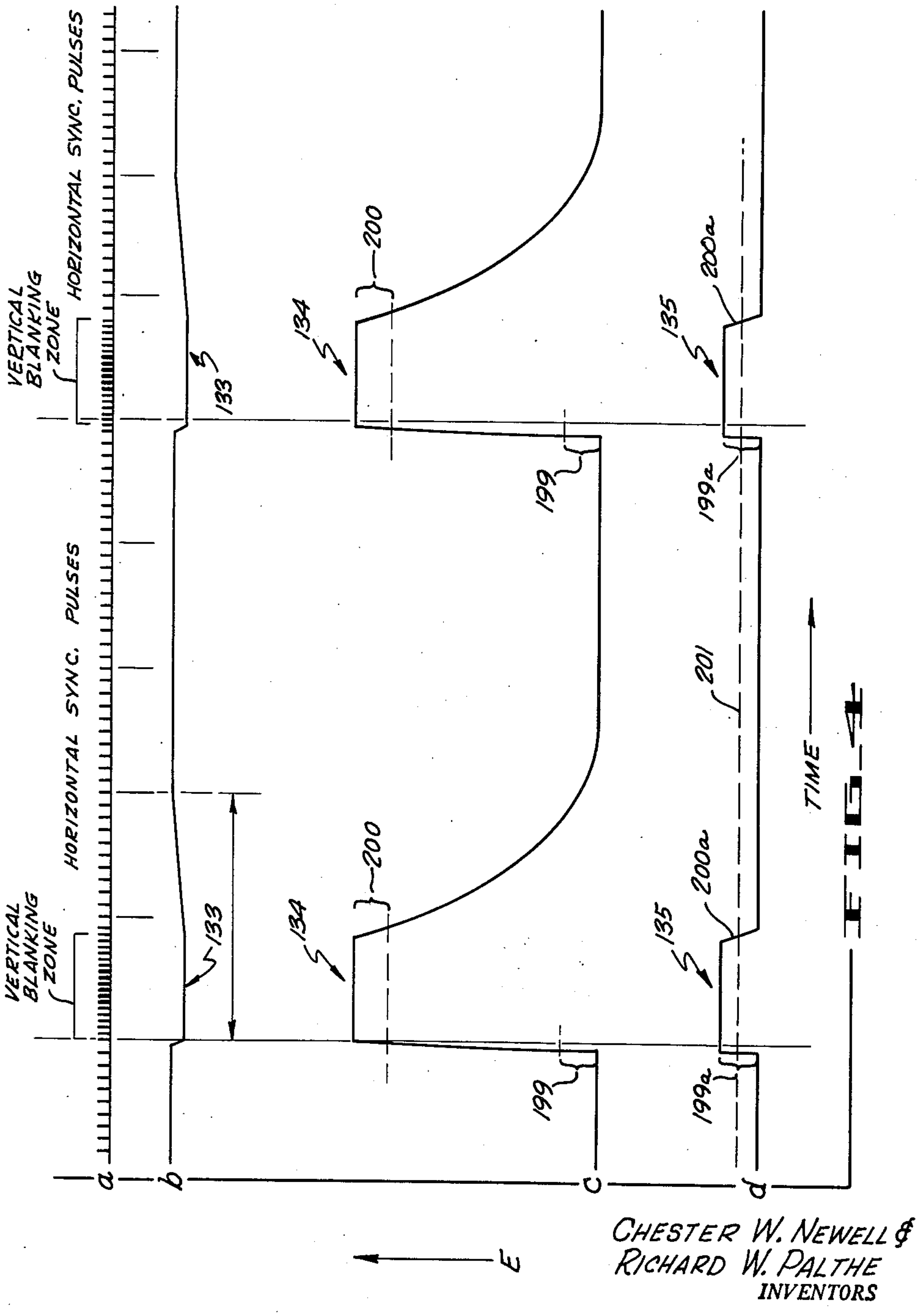
FIGURE 4 is a series of time-correlated wave-forms to a reduced scale and the operation of a television receiver and the separator of FIGURE 1.

Briefly, the pulse separator of the invention, as shown in FIGURE 1, includes a circuit 20 that receives a train of primary pulses, such as the video synchronizing pulses 21—50 of FIGURE 3*a*. The train of pulses 21—50 includes certain predetermined pulses, such as equalizing pulses 24—29 and 36—41, which are to be separated from the other pulses of the train for use in controlling the vertical retrace action of the cathode ray beam. As shown in FIGURE 3*c*, the circuit 20 develops secondary pulses 61—90, respectively, in response to each primary pulse 21—50, with the amplitudes of the secondary pulses varying as a function of the primary pulse widths. For example, the equalizing pulses 24—29 and 36—41, which are narrower than the other primary pulses 21—50, have corresponding secondary pulses 64—69 and 76—81 with amplitudes greater than the amplitudes of the other secondary pulses 61—63, 70—75, and 82—90. As shown in FIGURE 1, a clipping circuit 101 is connected to circuit 20 for passing the peak portions of the pulses 64—69 and 76—81 to form a train of tertiary pulses 104—109 and 116—121, as shown in FIGURE 3*d*, with each of the tertiary pulses corresponding with one of the predetermined (equalizing) pulses 24—29 and 36—41. As shown in FIGURE 1, an integrating circuit 131 is connected to the clipping circuit 101 to form a single quaternary pulse 132, as shown in FIGURE 3*e*, for each vertical blanking zone group of tertiary pulses. As shown in FIGURES 3*f* and 4*a–d*, a pulse shaping circuit 130 (FIGURE 1) is provided to form each quaternary pulse 132 into a flat-topped pulse 133, thence into a pulse 134 having increased verticality of the leading and trailing edges, and finally into a substantially rectangular pulse 135, suitable for use in a television receiving set, as shown in FIGURE 4.

Referring now to FIGURE 1, in detail, the circuit 20 is shown as including a resonating tank circuit composed of a variable inductor 151 connected in parallel with a capacitor 152. Incoming synchronizing signal 21—50, in negative phase form, it fed to the control grid 154 of an amplifying triode tube 156, the grid being biased to ground by means of a resistor 157, the cathode 158 of the tube being grounded, and the plate 159 of the tube being connected to a positive voltage source 161 through a resistor 162. One side of the resonant circuit 151—152 is connected to the plate 159 through a direct current (D.C.) blocking capacitor 163, and the other side of the circuit 151—152 is connected to ground through another D.C.-blocking capacitor 164. The amplifier 156 amplifies and inverts the synchronizing signal 21—50 for application to the resonating circuit 151—152 as previously described.

Figure 2:
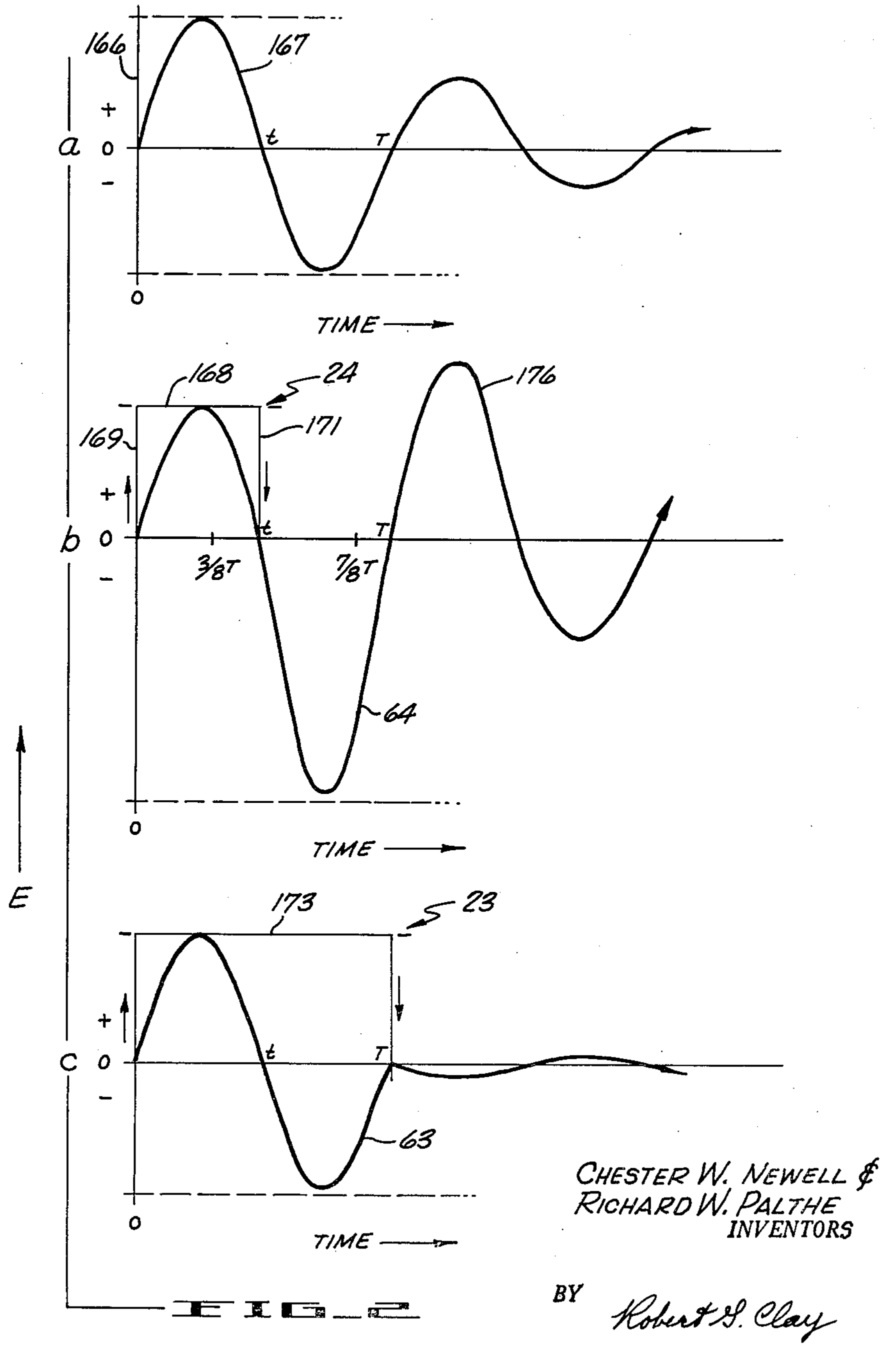
FIGURE 2 is a series of time-correlated wave-forms illustrating the operation of the invention.

The resonating circuit operates as follows, referring to FIGURE 2: In response to each positive-going edge 166 of a synchronizing signal pulse (i.e., the leading edges of the horizontal synchronizing and equalizing pulses, and the trailing edges of the vertical synchronizing serration pulses **30*a*—35*a*** as shown in FIGURE 3*a*), the circuit produces a damped sinusoidally oscillating voltage wave 167 (see FIGURE 2*a*) having a full-wave period T and a half-wave period *t* depending on the values of the circuit components. The negatively going edge of the pulse (trailing edge of horizontal synchronizing and equalizing pulses and leading edge of vertical synchronizing serration pulses) produces a like wave of opposite phase. The full-wave period T of the circuit is set to be approximately twice the width 168 of an equalizing pulse 24 (see FIGURE 2*b*), so that the energy put into the circuit by the leading edge 169 is reinforced in the negative swing by the full energy of the trailing edge 171, and the second half-wave 64 of the wave is substantially doubled in amplitude. But the width 173 (see FIGURE 2*c*) of a horizontal synchronizing pulse 23 is much greater than that of an equalizing pulse, and the second half-wave 63 produced thereby must remain of lesser amplitude. In fact the width of the horizontal synchronizing pulse 63 is substantially twice that of the equalizing pulse and therefore equal to T so that the half-wave 63 is not reinforced at all, and the wave thereof in the second wave period is damped to substantially zero amplitude.

It is here noted that it is not necessary to set the full-wave period T of the circuit at precisely twice the width of the equalizing pulse 24, although the maximum reinforcement is attained thereby. When the full-wave period T of the circuit is varied to be either greater or less than twice the equalizing pulse width, the amplitude of the half-wave 64 is decreased somewhat, but remains greater than the reinforced amplitude 63 produced by the horizontal synchronizing pulse throughout a wide range of variation. In face it has been determined that the period T of the circuit may be varied between values of 8/3 and 8/7 of the equalizing pulse width, or that conversely the accepted pulse width may be varied between values of 3/8 and 7/8 of the period T as shown in FIGURE 2*b*, without the amplitude of half-wave 64 becoming less than the amplitude of half-wave 63, or of the amplitudes of any other reinforced half-waves produced in the same phase direction of the horizontal synchronizing pulses.

Thus, it will be seen that the resonating circuit 151—152 responds to a wide range of equalizing pulse widths and is not de-tuned in the selection process by inadvertent variations in the widths thereof. Conversely, with the circuit initially set with the period T at twice the equalizing pulse width, the circuit may be mis-adjusted throughout a wide range without failing to discriminate between equalizing and horizontal synchronizing pulses, with the discrimination being reflected in the relative amplitudes of the half-waves 64 and 63 produced thereby.

With respect to vertical synchronizing pulses such as the pulses 30—35 of FIGURE 3*a*, and more particularly the serration pulses **30*a*—35*a* therebetween, it is noted that the serration pulses are substantially inverted horizontal synchronizing pulses, and that the half-waves 70—75 and 70*a*—75*a*** produced thereby are substantially of the same moderate amplitudes as the unreinforced half-waves produced by the horizontal synchronizing pulses.

The clipping circuit 101 by which the negative tips of the half-waves 64—69 and 76—81 are clipped off, to the exclusion of all the other negative half-waves, includes a means biasing the resonating circuit 151—152 from ground potential in a second (positive) phase direction opposite to that (negative) of the half-waves 64—69 and 76—81. The biasing means is here shown as a relatively high-value fixed resistor 176 connected in series with the voltage source 161 and with a relatively low-value variable resistor 177, which is grounded, the wiper 178 of the variable resistor being connected to the coupled terminals of the capacitor 164 and the resonating circuit 151—152. The wiper 178 is adjusted so that the axis potential 179 (FIGURE 3*c*) of the waves produced by the resonating circuit is biased in the second (positive) phase direction, and for a potential less than the peak amplitude values of the half-waves 64—69 and 76—81, but greater than the peak amplitudes of the other negative half-waves. Thus only the peak portions of the half-waves 64—69 and 76—81 will ever have negative voltage values. The clipping circuit 101 also includes a one-way current diode 181 connected to the coupled terminals of the capacitor 163 and the resonating circuit 151—152 and poled to permit the flow of current to the resonating circuit whenever the circuit has positive potential, but to block the flow of current thereto at negative potentials. Thus the clipping circuit 101 functions to pass only the negative tips of the half-waves 64—69 and 76—81, and causes a tertiary signal to be emitted, as shown in FIGURE 3*d*, consisting only of pulses 104—109 and 116—121, which correspond in time to the equalizing pulses 24—29 and 36—41 exclusively.

It will be seen that there are twelve pulses 104—109 and 116—121 for each vertical blanking zone of the video synchronizing signal. To transform these twelve pulses into a single pulse representing the blanking zone, so as to activate the vertical oscillator only once per zone, there is provided an integrating circuit 131 here shown (FIGURE 1) as composed of a parallel-connected resistor 182 and capacitor 183, the circuit being connected between the diode 181 and ground. Whenever the half-waves 64—69 and 76—81 have a negative potential and are producing the pulses 104—109 and 116—121, the capacitor 183 of the integrating circuit is charged toward the potential of the peak value of the leading pulse 104 of the vertical blanking zone. The integrating circuit 182—183 has a time-constant for slow timed discharge thereof through the resistor 182, the time-constant being substantially greater than the time duration of the vertical blanking zone, but substantially less than the time interval between successive vertical blanking zones of the video synchronizing signal. Thus, the charge of the integrating circuit is perpetuated throughout the blanking zone time period substantially as shown in FIGURE 3*e*, but gradually decreases during the next intervening series of horizontal synchronizing pulses 42—50, etc., and substantially before the arrival of the next following vertical blanking zone, as shown in FIGURE 4. A series of quaternary pulses 132 is thus created, each representing twelve pulses 104—109 and 116—121, or one vertical blanking zone. It is noted, however, that the possible form of the pulse 132 (FIGURE 3*e*) includes a somewhat jagged peak caused by slight decay of the integrating circuit charge between successive equalizing pulses and particularly between the two groups thereof, preceding and following the vertical synchronizing pulses. Therefore, the pulse 132 is not permitted to build up to full peak strength, but is clipped in growth in the pulse shaping circuit 130 by a one-way current diode 186 (see FIGURE 1) for limiting the quaternary pulse amplitudes. The diode 186 is connected to the coupled terminals of the diode 181 and the integrating circuit 182—183 through a limiting resistor 187, which prevents overload and damping of the resonating circuit 151—152. The diode 186 is also grounded through a D.C.-blocking capacitor 188 and is poled to permit passage of current from ground and discharge of the integrating circuit 182—183 for all negative voltages thereof in excess of the clipping level, which is chosen to be slightly less negative than the jagged potential peak of the pulse 132, but substantially more negative than ground potential. The clipping level is established by means of a variable resistor 189 connected between a negative voltage source 190 and ground, with the wiper of the variable resistor 189 connected to the junction of the diode 186 and the capacitor 188. Thus a flat-topped quaternary pulse 133 is created as shown in FIGURES 3*f* and 4*b*.

To further shape the pulses 133 for use in the vertical oscillator, there is provided a second amplifier here shown (FIGURE 1) as a triode tube 191, the grid 192 of which is connected to the coupled terminals of the resistor 187 and the diode 186, the cathode 193 of the tube being grounded, and the plate 194 of the tube being connected to the voltage source 161 through a resistor 195. Thus, the tube 191 amplifies and inverts the pulses 133 (FIGURES 3*f* and 4*b*) to provide corresponding pulses 134, as shown in FIGURE 4*c*, with the verticality of the leading and trailing edges of the pulses 134 being exaggerated.

Also provided in the pulse shaping circuit 130 is a clamping and clipping means to produce a substantially square output wave form 135 (FIGURE 4*d*), the means being here shown (FIGURE 1) as including a blocking capacitor 196 coupled between the plate 194 of tube 191 and an output terminal 197 of the circuit, and a Zener diode 198 coupled between the output side of capacitor 196 and ground. The Zener diode 198 is chosen to be open in a current-conducting mode whenever the potential of the terminal 197 seeks to rise above zero potential or to descend below a preselected negative potential (for example, —9 volts), and to be closed in the non-conducting mode between these two limits. Thus, as the plate 194 potential begins to rise, as indicated by the base segment 199 of the wave 134 leading edge (FIGURE 4*c*), the terminal 197 potential rises in response from —9 to zero volts, with the diode 198 in the blocking mode. At substantially zero potential of the terminal 197, the diode 198 breaks down and becomes conducting, maintaining the terminal 197 at zero potential while the plate 194 voltage completes its positive excursion to peak voltage of the wave form 134. Thus it is seen that the leading edge 199*a* of output wave 135 corresponds in slope to the base segment 199 of the leading edge of wave 134, or in other words to the segment of steepest slope. Subsequently, when the plate 194 potential begins to descend as indicated by the upper segment 200 of the trailing edge of wave 134, the diode 198 returns to blocking mode and causes the terminal 197 potential to descend correspondingly as far as —9 volts, when the diode 198 becomes conducting in the reverse direction during the remainder of the plate 194 excursion to base level, and with the terminal 197 potential remaining meanwhile at —9 volts. Thus it is seen that the trailing edge 200*a* of the wave 135 corresponds in slope with the segment 200 of wave 134, again the segment of steepest slope. The output signal pattern, of course, remains at its base level until the beginning of the next subsequent positive voltage excursion of the plate 194 (wave 134), when the cycle is repeated.

The improved verticality of the leading edge 199*a* of output wave 135 thus provides for essentially error-proof triggering of the vertical retrace oscillator, having a grid cut-off level at, say the level of line 201 of FIGURE 4*d*. Alternatively, the output signal 135 may be biased, as by means well-known in the art and not here shown, to have a positive phase crossing a positive level of the oscillator grid cut-off.

Figure 5:
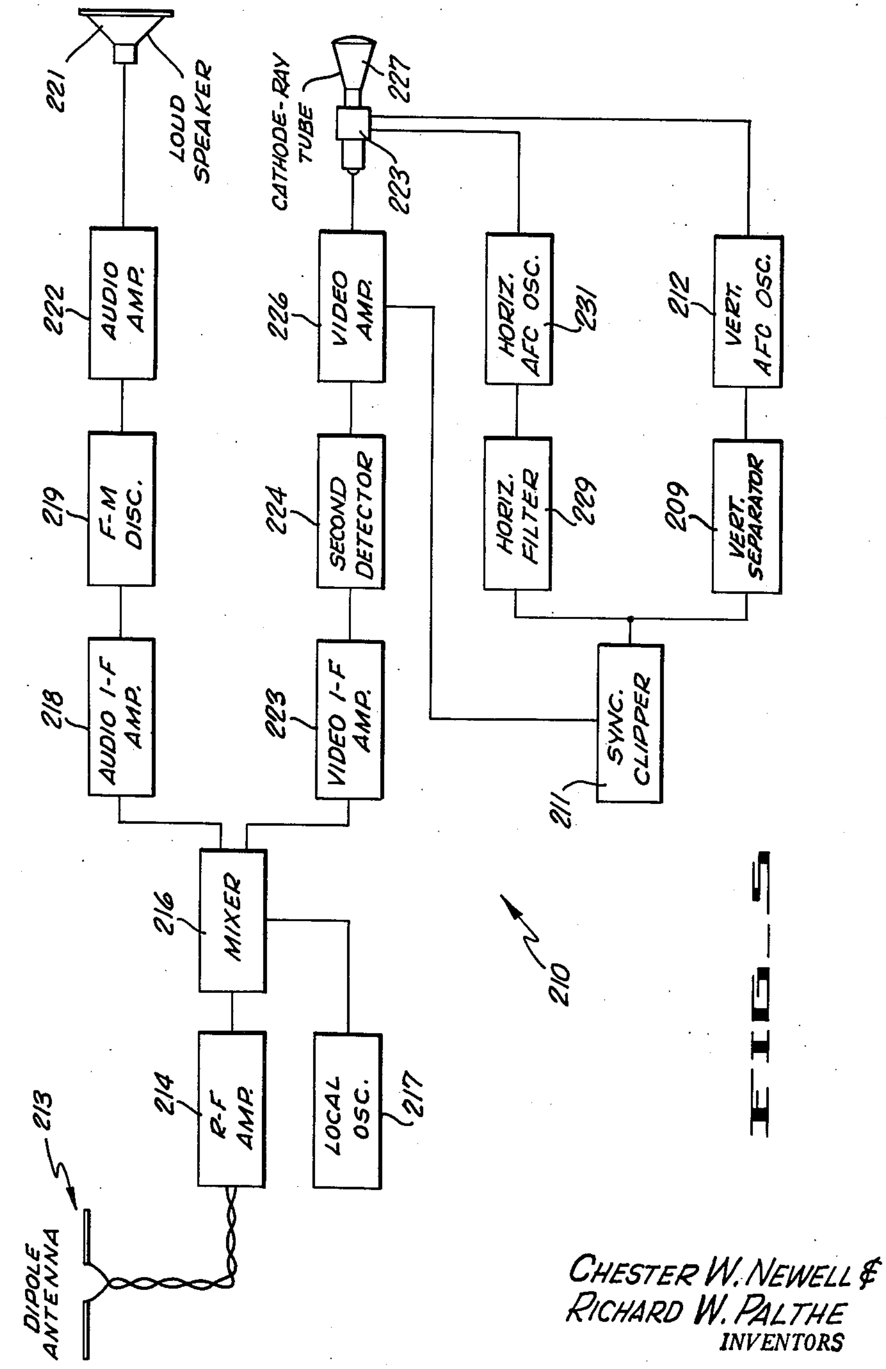
FIGURE 5 is a schematic block diagram showing the connection of the separator of the invention in combination with a typical television receiving set.

In FIGURE 5 there is shown the manner in which the separator 209 of the invention is connected in combination with a typical television receiving set 210 between a synchronizing signal clipper 211 thereof and a vertical oscillator 212 thereof. The set 210 has a dipole antenna 213 connected to a radio frequency amplifier 215, the output of which is fed to a mixer 216 governed by a local oscillator 217. The output of the mixer 216 is fed to an intermediate frequency amplifier 218, thence to a discriminator 219, and the output of the discriminator to a loud-speaker 221 through an amplifier 222, all of these components and their connections being well known in the art. Also, as well known, the video output of the mixer 216 is fed to an intermediate frequency amplifier 223, thence to a second detector 224, and thence to a video amplifier 226. The signal picture information is fed from thence to the cathode-ray tube 227 while the picture information is collected and clipped by the synchronizing clipper 211 to leave only the synchronizing portions 21—50 of the signal, in negative phase form as previously described. A horizontal filter 229 receives the synchronizing signal from the clipper 211 and responds to the suitably phased leading edges of the pulses thereof to trigger a horizontal oscillator 231 with automatic frequency control (A.F.C.), which activates the deflection yoke 232 of the tube 227 to provide horizontal scanning of the beam thereof. Also provided is the vertical oscillator 212 with automatic frequency control (A.F.C.), and connected to the yoke 232 to provide vertical scanning and retrace of the beam. Instead of the usual vertical filter, however, the separator 209 of the invention is connected to the clipper 211 to receive the synchronizing signal therefrom and to provide the vertical triggering pulses 135 above described to the vertical oscillator 212.

It is here noted that the provision of the integrating circuit 182—183 and the formation of the broad quaternary pulse 133 is not needed to insure satisfactory operation of the separator of the invention when it is possible to also eliminate the equalizing pulses 25—29 and 36—42 and the vertical synchronizing pulses 30—35 from the broadcast video signal. All that would then be needed to provide vertical synchronizing information is the leading equalizing pulse 24 of each vertical blanking zone. The present invention was conceived to respond to such a modified form of broadcast signal, as well as to the customary form of FIGURE 5, as above described.

It is also noted that the present invention, embodied either with or without the integrating circuit 182—183, may be adapted to respond to horizontal synchronizing pulses rather than to the equalizing pulses, merely by changing the values of various circuit components. For example, if the full-wave period T of the resonating circuit 151—152 is set to equal twice the pulse-width of the horizontal synchronizing pulse, then the second half-wave of the tank output for the horizontal synchronizing pulse is amplified but not the second half-wave produced for the equalizing pulse. It is then desirable also to reduce the time constant of the integrating circuit 182—183 to a value less than that of the period between horizontal synchronizing pulses. Such an adaptation is useful in color television reception, when it is desired to have a signal responsive to the arrival of each horizontal synchronizing pulse to initiate action in connection with the immediately following group of color burst pulses.

As for use of the invention with pulse regenerating devices, it is clear that the earlier indication provided upon arrival of each vertical blanking zone is of value in reducing the probability of timing error for the regenerated pulses.

There has been described a separator responding exclusively to input pulses of pre-selected widths so as to produce output pulses corresponding uniquely therewith, the separator being adapted for indicating the arrival of each vertical blanking zone of a broadcast television signal with improved accuracy and promptitude, and being arranged to function with undiminished discrimination throughout a wide range of adjustment and a wide range of inadvertent variation in the widths of the individual pulses that are separated; the separator of the invention being also adapted to respond instead to horizontal synchronizing pulses as supplied in color television broadcasting, or to any desired pulse in regeneration devices.

What is claimed is:

1. A separator responsive to the leading equalizing pulse in each vertical blanking zone of a video synchronizing signal, comprising: means responsive to said signal for producing a secondary pulse corresponding to each of said equalizing pulses and only said equalizing pulses; and means coupled to said first-named means and responsive to said secondary pulses for producing a single tertiary pulse for each vertical blanking zone.

2. A separator as in claim 1, wherein said last-named means is further provided for producing said tertiary pulses with a time-duration somewhat greater than the time-duration of the corresponding vertical blanking zone and substantially less than the time-duration of the corresponding video field.

3. A separator responsive to the leading pulse in each vertical blanking zone of a video synchronizing signal, comprising: a parallel-connected inductance-capacitance resonating circuit having input means for receiving said synchronizing signal and functioning to emit a damped sinusoidally oscillating voltage wave in response to each pulse of said signal with each wave having a first and a second half-wave, said resonating circuit being tuned to reinforce the second half-waves corresponding with said leading vertical blanking zone pulses to greater amplitudes in a first phase direction than any of the half-waves corresponding with the horizontal synchronizing pulses of said signal; clipping means connected to said resonating circuit for passing at most the peaks of said reinforced half-waves having the same phase directions as the reinforced half-waves stimulated by said leading pulses of said vertical blanking zones, said means emitting a train of tertiary pulses corresponding with said peaks; a parallel-connected resistance-capacitance integrating circuit connected to said clipping means for receiving said tertiary pulses therefrom, said integrating circuit being chosen with a time-constant substantially greater than the time duration of said vertical blanking zone but substantially less than the time interval between successive vertical blanking zones of said video signal, whereby a train of quaternary pulses is emitted by said integrating circuit with the leading edges and peak amplitudes of said quaternary pulses corresponding with the leading edges and peak amplitudes of the tertiary pulses produced by the leading synchronizing pulse of each vertical blanking zone, and with the trailing edge of each quaternary pulse falling subsequently in time to the passage of the trailing end of the corresponding vertical blanking zone but previous in time to the arrival of the next following vertical blanking zone, so that each quaternary pulse signals the end of a separate video field.

4. A separator as characterized in claim 3, wherein said resonating circuit is tuned to a full-wave period having a value falling between 8/3 and 8/7 of the width of one of said leading pulses of said vertical blanking zone.

5. A separator as characterized in claim 3, wherein said resonating circuit is tuned to a full-wave period having a value that is substantially double the value of the width of one of said leading pulses of said vertical blanking zone.

6. A separator as characterized in claim 3, wherein said resonating circuit is tuned to a full-wave period substantially equal to the width of one of said horizontal synchronizing pulses of said video signal.

7. A separator as characterized in claim 3, wherein said clipping means includes means biasing said resonating circuit from ground potential in a second phase direction opposite to that of said reinforced half-waves stimulated by the leading pulses of said vertical blanking zones, and for a value substantially less than the peak amplitudes of said leading-pulse reinforced half-waves but substantially greater than the peak amplitudes of the other half-waves; and a diode connected between said resonating circuit and said integrating circuit and functioning to charge said integrating circuit upon application to said diode of voltage energy from said resonant circuit in excess of ground potential in a direction opposite to said second phase direction, whereby said integrating circuit is charged substantially only by the reinforced half-wave stimulated by the leading pulse of each vertical blanking zone.

8. A separator as characterized in claim 3 and also including: means connected to said integrating circuit for limiting the amplitudes of said quaternary pulses to clip away the tips thereof to leave a flat-topped wave form therefor; an amplifier connected to said last-named means for amplifying said clipped quaternary pulses to exaggerate the verticality of the leading and trailing edges thereof; and means connected to said amplifier for clamping and clipping said amplified pulses to provide ultimately squared wave forms therefor.

9. A separator as characterized in claim 8, wherein said limiting means includes a diode connected across the output of said integrating circuit and functioning to conduct and to thereby discharge said integrating circuit at a limiting charge value substantially smaller than the peak potential of said leading-pulse reinforced half-wave.

10. A separator as characterized in claim 8 wherein said clamping and clipping means includes a capacitor connected in the voltage output line of said amplifier for receiving a charge therefrom during the peak excursion of each of said amplified quaternary waves; and a Zener diode tube connected between ground potential and the output line of said capacitor, said Zener diode having a non-conducting range bounded by ground potential and by a second potential corresponding with said predetermined amplitude of said ultimately formed quaternary pulse, said Zener diode functioning to maintain the charge on said capacitor between a peak limiting value corresponding with ground potential and a base limiting value corresponding with said second potential.

11. A separator substantially as characterized in claim 3 in combination with a television receiving set having a synchronizing signal clipper and a vertical synchronizing oscillator, said separator being connected between said signal clipper and said oscillator and functioning to provide said quaternary pulses thereof as triggering pulses for said oscillator.

References Cited in the file of this patent

UNITED STATES PATENTS 2,529,172 Moe ---------------- Nov. 7, 1950

OTHER REFERENCES

Radio Engineering, Terman, third edition, McGraw-Hill Book Co., Inc., copyright 1947, pp. 599, 600, 601 relied on.